Patented Oct. 12, 1926.

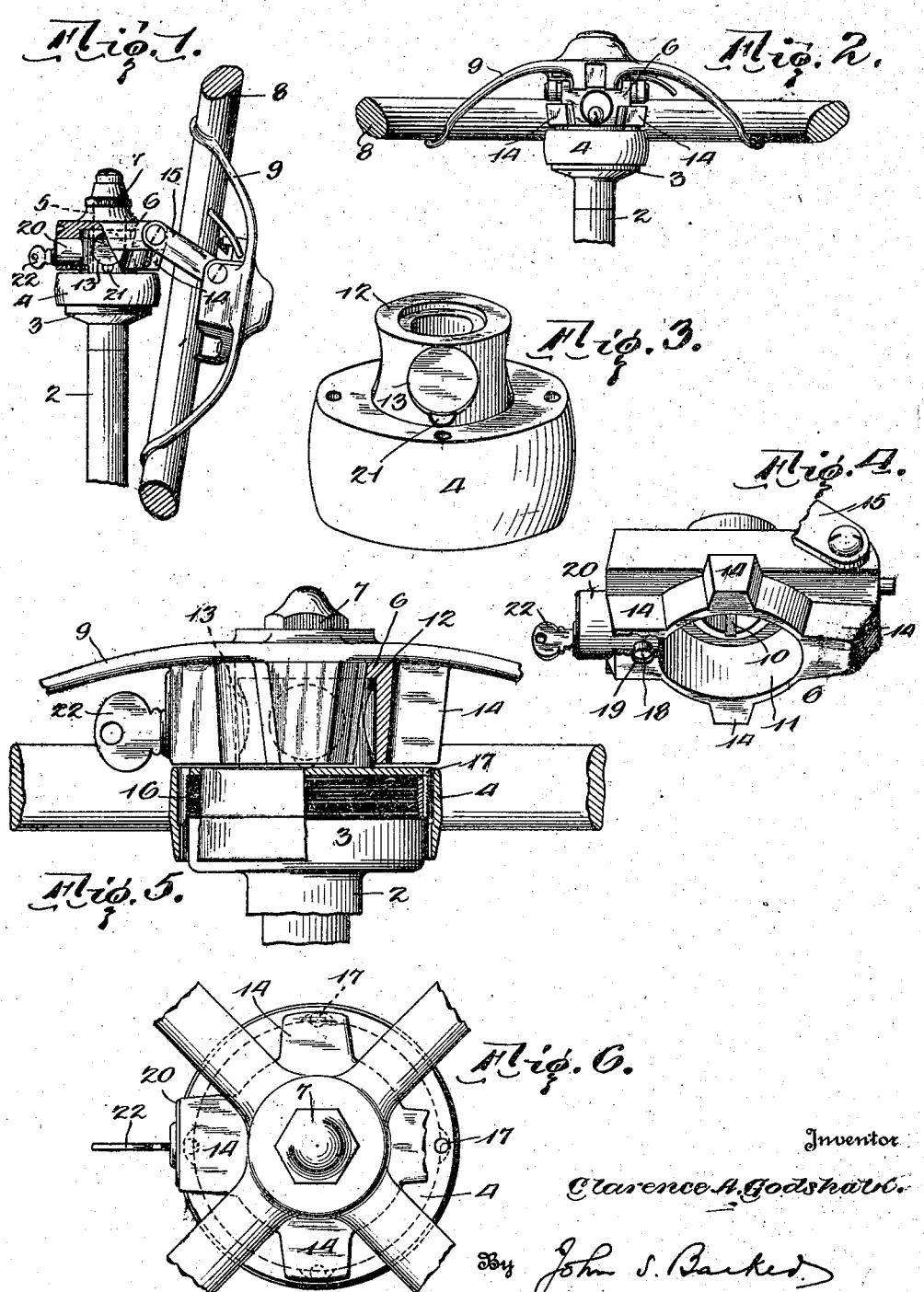

1,603,045

UNITED STATES PATENT OFFICE.

CLARENCE A. GODSHALK, OF PHILADELPHIA, PENNSYLVANIA, ASSIGNOR TO FOX AUTOMOTIVE PRODUCTS CORPORATION, OF PHILADELPHIA, PENNSYLVANIA, A CORPORATION OF DELAWARE.

STEERING-WHEEL LOCK.

Application filed November 4, 1924. Serial No. 747,758.

My invention relates to steering mechanism for motor vehicles, particularly to that type employing a hand wheel that is adapted to be disconnected, at the pleasure of the operator, from in the steering shaft, so that when so disconnected the shaft cannot be turned for steering the vehicle. I have represented my invention as applied to the steering mechanism of a motor vehicle of the Ford type, although it is not limited to such specific construction of vehicle.

The invention herein presented was shown and originally claimed in an application for patent filed jointly by myself and David Behrsing November 6, 1922, Serial No. 599,292, having since issued as Patent Number 1,543,047, dated June 23, 1925.

In the accompanying drawings—

Figure 1 is a view partly in elevation and partly in section illustrating my invention applied to a steering mechanism having a tilting hand wheel, the steering mechanism being represented as locked.

Fig. 2 is an elevation, the rim of the steering wheel being broken away, illustrating the parts in operative position for steering.

Fig. 3 is a perspective view enlarged of the separable cap covering the gear case of the steering mechanism.

Fig. 4 is a perspective view, parts broken away, of the hub of the steering wheel, as viewed from below. Fig. 5 is a view partly in elevation and partly in section, showing my invention applied to a stiff or non-tilting wheel.

Fig. 6 is a plan view of the mechanism represented in Fig. 5, parts being broken away.

Referring to the drawings, 2 indicates the stationary non-rotatable column of the steering mechanism of a motor vehicle, 3 the gear case supported at the upper end of the column, and 4 the cap that closes the open end of the gear case. The rotatable steering shaft 5 has keyed to it a part, designated 6, that I term the spider hub, because the spider 9 that supports the rim 8 of the steering wheel, is connected thereto, and the part 6 serves as the hub therefor when the wheel is in use. 7 designates the nut engaging the screw-threaded end of the shaft 5 and holding the spider hub in place. This hub may be variously formed, that represented in Figs. 5 and 6 being adapted for use in connection with a stiff or non-tilting wheel, while that shown in the other views is especially devised for use in connection with a tilting wheel of a specific form, which is not herein claimed but is the subject matter presented in the aforesaid joint application of myself and David Behrsing. The hub is keyed to the steering shaft 5, being formed with a key seat 10, shown in Fig. 4. The shaft 5 may be either the short primary or first shaft of the steering mechanism of a planetary gear type of steering mechanism, such as is used upon Ford cars, or may be the shaft that extends through the column 2 of steering mechanism employing worm gearing. The cap 4 of the gear case is provided with a concentrically disposed projection 12 that is adapted to be surrounded by the hub of the steering wheel, the latter being formed with a recess or opening 11 shaped to fit the said projection. The extension 12 has formed in it a plurality, preferably four, of recesses 13 that are adapted to receive the inner end of the body of a lock 20 to be described.

The cap of the gear case is secured to the latter as is usual by screw threads 16, and to prevent the turning of the cap during operation of the steering mechanism, or when the steering mechanism is locked, I use pins or screws 17 to unite the gear cap to its case. The upper surface of the portion of the gear case cap which is outside the projection 12 and is concentric therewith, is preferably flat, as represented in Fig. 3, and the openings through which the pins 17 are inserted are through this surface.

The lock for the steering wheel mechanism is key-operated, and is preferably formed with a cylindrical body 20 fitting into a radial socket formed therefor in that portion of the spider hub that surrounds the recess 11, and in which socket the lock casing is movable longitudinally, permitting its inner end to enter any recess 13 in the central projection 12 of the cap 4 that may be opposite the said socket, when the lock casing is moved inwardly as far as permissible, as represented in Fig. 1. The lock is adapted to be operated by a key 22, and is provided with a radial bolt 18 controlled by the key and adapted to be projected outwardly, so as to lie in a recess 19 shown in Fig. 4, when the lock casing is moved outwardly to unlock the steering mechanism; or to occupy a recess 21, see Fig. 3, formed therefor in the projection 12, when the lock is moved inwardly into the locking position, represented in Fig. 1.

It will be understood that whenever the steering wheel is to be used, the lock, by the proper use of the key 22, is moved into the position represented in Fig. 4, where it is retained by reason of the bolt 18 occupying the recess 19. When in this position the inner end of the casing 20 of the lock is within the lock seat formed in the spider hub, so that the said hub, the steering wheel and the other parts of the mechanism connected therewith, may be turned freely about the stationary projection 12. This represents the normal working condition of the steering mechanism. When, however, it is desired to lock the steering mechanism and prevent unauthorized use of the vehicle, the key is inserted into the lock, the bolt 18 retracted, and the casing 20 of the lock is moved radially inward until its inner end is seated in one of the recesses 13, and the bolt 18 then caused to enter a recess 21. The key is then removed, and the lock serves to prevent the turning of the hub of the wheel spider or any of the moving parts of the steering mechanism, and also prevents the removal of the steering wheel, should this be attempted by taking off the nut 7.

Since the steering wheel is locked to the cap 4 and this in turn is connected with its gear case by screw threads, it follows that a locked steering wheel might nevertheless be turned and the vehicle steered, by removing the pins 17 and causing the gear case cap to turn on the screw threads that unite it to the gear case 3. To prevent such unauthorized operation I provide that portion of the spider hub which surrounds the central projection 12 of the gear case with a flange overlying the flat top of the gear case. Such flange is preferably broken, so as to form a series of outwardly extending or radial lugs 14, there being preferably four of these, or as many as there are recesses 13 in the projection 12. The flange portion of the spider hub, whether it be a broken flange as shown or of other form, overlies the ends of the screws or pins 17 employed to lock the cap against turning on the gear case. The disposition of the lugs 14 and the location of the pins 17 have such relation to each other that whenever the wheel is locked, as represented in Fig. 1, each pin, whether there be one or more of these employed to hold the gear case in position, is covered by one of the lugs, and as the lower faces of these are very close to the upper face of the top of the gear case it is impossible to have access to the pins or screws 17 so long as the wheel is locked. When, however, the wheel is unlocked, by causing the lock to assume the position represented in Fig. 4, the steering wheel with its spider hub may be turned, relative to the gear cap, so as to expose the ends of the pins or screws 17, which may then be removed to allow the cap to be taken off, as is sometimes necessary, for the purposes of lubrication, inspection of the gearing within the case, for repairs, etc.

In that form of my invention represented in Figs. 5 and 6 the radial spokes or arms of the wheel spider are represented as being integral with or secured rigidly to the hub 6. In the form of invention illustrated in the other views the wheel spider is connected with the hub 6 by links 15, arranged to permit the wheel to be tilted.

The socket or seat for the casing 20 of the lock is represented as being formed in one of the lugs 14 which, for that purpose, may be enlarged, as compared with its companion lugs.

What I claim is:

1. In an automobile steering mechanism, the combination with a stationary column, a gear case at the upper end thereof, having a removable cap, a plurality of locking pins for holding the cap securely in place on the gear case, and a steering shaft mounted in the column, of a steering wheel, a spider hub to which the wheel is connected secured to the steering shaft and free to turn relative to the gear case, and a lock for uniting at will the spider hub to the gear case, the spider hub being formed with a plurality of lugs covering the ends of the locking pins when the wheel is locked, but permitting the pins to be exposed when the wheel is unlocked and properly turned.

2. The combination with a steering shaft, and a stationary column in which the shaft is mounted, of a spider hub secured to the shaft, an extension carried by the column and entering the spider hub, in which are locking recesses, a lock mounted in the spider hub and adapted to engage with the recesses in the said extension, to lock the steering wheel, and a tilting steering wheel pivotally united with the spider hub and having a lock seat in which the lock is secured when the wheel is in working position.

3. The combination of an open-ended case for enclosing gearing, a cap covering the said case, the cap being united to the case by screw threads, a plurality of locking pins which pass through openings in the top of the cap to prevent the turning of the cap on the case, and a concentrically arranged rotatable hub overlying the gear cap and connected with a manually operated wheel, the hub being provided with a flange that extends outwardly sufficiently far to overlie the exposed ends of the connecting pins.

4. In steering mechanism for motor vehicles, the combination of a stationary column, a gear case at the end of the column, a removable cap enclosing the gear case connected therewith by screw threads and provided with a central projection in which is formed a locking recess, a pin operating to prevent the cap from turning relative to the gear case, a steering shaft extending through the cap and central projection carried thereby, a steering wheel secured to the shaft, the hub of the wheel being provided with a flange adapted to overlie the cap and to cover the exposed end of the pin employed to prevent the cap from turning, and a key-operated lock supported in the wheel hub and adapted to have a portion thereof moved to enter the locking recess in the projection of the cap and thus lock the wheel, the flange of the wheel hub being shaped to overlie and conceal the pin when the wheel is locked.

5. In steering mechanism for motor vehicles, the combination of a stationary column, a gear case at the end thereof, a removable cap for the gear case connected therewith by screw threads and carrying a central projection, a pin operating to prevent the cap from turning, a steering shaft extending through the central projection of the cap, a steering wheel secured to the shaft, the hub of the wheel being concentric with the projection of the cap and provided with a flange adapted to overlie the exposed end of the pin, the flange being broken to form a series of radial lugs, and a lock supported in one of the said lugs and adapted to engage with the central projection of the cap, the aforesaid lugs being arranged to overlie and conceal the pin whenever the wheel is locked, but permitting the pin to be exposed when the wheel is unlocked.

CLARENCE A. GODSHALK.

Certificate of Correction.

It is hereby certified that in Letters Patent No. 1,603,045, granted October 12, 1926, upon the application of Clarence A. Godshalk, of Philadelphia, Pennsylvania, for an improvement in " Steering-Wheel Locks," errors appear in the printed specification requiring correction as follows: Page 2, line 122, claim 3, strike out the word " and," and line 127, after the word " pins " and before the period insert the words *and a lock carried by the hub for preventing the turning of the manually operated wheel;* and that the said Letters Patent should be read with these corrections therein that the same may conform to the record of the case in the Patent Office.

Signed and sealed this 9th day of November, A. D. 1926.

[SEAL.]

WM. A. KINNAN,
*Acting Commissioner of Patents.*